United States Patent [19]

Magee et al.

[11] Patent Number: 4,618,824
[45] Date of Patent: Oct. 21, 1986

[54] METHOD OF TESTING THE OPERABILITY OF CHECK VALVES

[75] Inventors: Robert D. Magee, Monroeville; Michael J. Asztalos, Churchill; Vuong D. Trinh, Monroeville, all of Pa.

[73] Assignee: Westinghouse Electric Corp., Pittsburgh, Pa.

[21] Appl. No.: 631,285

[22] Filed: Jul. 16, 1984

[51] Int. Cl.⁴ .............................................. G01B 7/14
[52] U.S. Cl. .................................... 324/208; 137/554
[58] Field of Search ............................. 324/207, 208; 137/487.5, 554, 527, 527.8, 522; 251/65

[56] References Cited

U.S. PATENT DOCUMENTS

| | | |
|---|---|---|
| 3,012,177 | 12/1961 | Mortimer . |
| 3,355,728 | 11/1967 | Smith . |
| 3,500,365 | 3/1970 | Cain . |
| 3,602,254 | 8/1971 | Fawkes ............................... 137/554 |
| 3,621,870 | 11/1971 | Harchal et al. . |
| 3,633,615 | 1/1972 | Rhodes ............................... 137/554 |
| 3,905,391 | 9/1975 | Oakes ................................. 251/65 X |
| 3,906,469 | 9/1975 | Kronk .............................. 340/188 R |
| 4,353,390 | 10/1982 | Karpenko ....................... 137/554 X |

*Primary Examiner*—Reinhard J. Eisenzopf
*Assistant Examiner*—Robert W. Mueller
*Attorney, Agent, or Firm*—Daniel C. Abeles

[57] ABSTRACT

A method of testing the operability of check valves having a pivotal closure disk wherein a check valve is provided having a valve body and first sealing member of nonmagnetic material and a pivotal closure disk and second sealing member of magnetic material, and a magnetic field is applied in a direction which causes the closure disk to move away from the first sealing member. The attraction between the magnetic field generator and the closure disk is measured to determine the relative position of the closure disk to the first sealing member and thus the operability of the valve.

5 Claims, 2 Drawing Figures

METHOD OF TESTING THE OPERABILITY OF CHECK VALVES

Check valves which provide for one directional flow of a fluid through a conduit are well-known. A particularly advantageous type of such a check valve is that which has a pivotal closure disk that seats against a sealing member in a valve body. With the pressure against the closure disk in sealing position being greater than the pressure against the disk from a direction which would open the pivotal disk the valve is maintained closed. Should the pressure against the closure disk in sealing position drop to a value below the pressure against the disk from a direction which would open the pivotal disk, the valve opens automatically.

Such valves are frequently used in coolant systems for nuclear power plants, for example between a reactor coolant water storage tank and a containment spray system. Since under many conditions, the check valves remain closed for extended periods of time, but must be assured to be operable when the valve is to be opened under specific conditions, intermittant operation or other testing of the valves must be made.

In use with reactor coolant systems, Section XI of the ASME Code requires that every reactor coolant pressure boundry check valve be verified operable. At every cold shutdown, each pressure boundry check valve must be fully lifted to verify operability. In some systems, the check valve in each accumulator discharge line cannot be fully tested unless the accumulator is partially blown down at each refueling. Such drastic measures would have the following detrimental effects: (a) added boric acid from the accumulator would require additional time-consuming dilution prior to reactor start up; (b) technical specifications for accumulator level must be reestablished more frequently; this requires large quantities of nitrogen and tedious adjustment in accumulator water levels, while the numerous stop/start cycles of high head safety injection pumps required to fill the accumulators would shorten pump motor life; and (c) the increased number of accumulator blowdowns would necessitate a review of the number of transients and stresses on the reactor coolant pipe nozzles.

An alternative to the above scheme is to use check valves which have external connections, such as levers, to the check valve disk. These levers, connected to the disk, allow the check valve disk to be operated manually outside the pressure boundry. The lever or stem, since it must extend through the check valve body, would be susceptible to valve packing failures. Any resultant valve leakage and resulting crystallization of the boric acid is felt to be a significant disadvantage in the use of such mechanically testable valves.

A need thus exists for a method of testing the operability of check valves without the flow of fluid through the valve and without the need for any levers or extensions which extend through the valve body.

SUMMARY OF THE INVENTION

A method for testing check valves for operability, without the need for passage of fluid through the valve, or removal of the valve from a conduit in which it is placed, is provided, wherein a pivotal closure disk is formed of magnetic material while the remainder of the valve body is formed from nonmagnetic material, and a magnetic field is applied to move the disk to open position.

A check valve is provided having a nonmagnetic valve body and first sealing member, and a pivotal closure disk of magnetic material, a magnetic field produced by a magnetic field generator is applied to the check valve in a direction that causes the magnetic closure disk to move away from the first sealing member, and a measurement is effected of the attraction between the magnetic field generator and the magnetic valve disk to determine the relative position of the magnetic disk to the first sealing member under the influence of the magnetic field, and thus the operability of the check valve.

DESCRIPTION OF THE DRAWINGS

The drawings illustrate the operation of the present method wherein.

DETAILED DESCRIPTION

The present method provides a means for testing the operability of a check valve having a pivotal closure disk without the need for flow of fluid through the valve.

Figure 1:
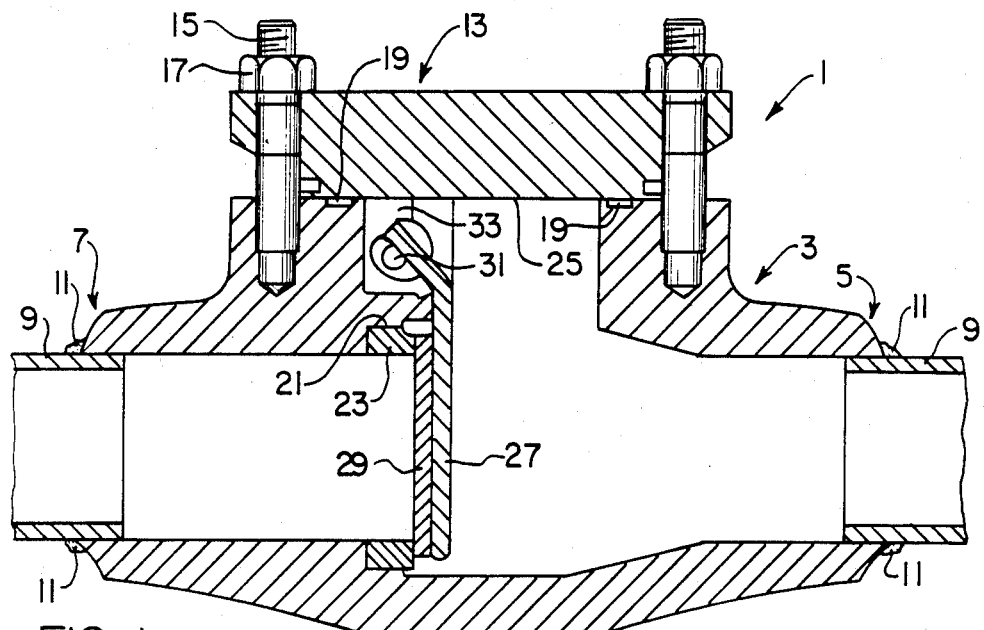
FIG. 1 illustrates the provision of a check valve having a valve body formed of nonmagnetic material and a closure disk of magnetic material.

Referring now to FIG. 1, a check valve 1, is illustrated. The check valve 1 has a valve body 3 which is adapted at both ends 5 and 7 for placement into a conduit 9. The valve body is affixed to the conduit 9 such as by welds 11. A bonnet 13, of the check valve body 3, is connected to the remainder of the valve body such as by bolts 15 and nuts 17 and, with seals 19, seals the upper wall of the valve body 3.

The valve body 3 has an inner groove 21 which contains a first sealing member 23. Positioned within the valve body 3, and preferably affixed to the underside 25 of the bonnet 13, is a pivotal closure disk 27, having a second sealing member 29. The pivotal closure disk 27 is pivotal about a pivot 31 in a bearing 33. The second sealing member 29 of the pivotal closure disk 27, when in closed position, seats against first sealing member 23 to seal off the conduit 9. In opening of the check valve, the pivotal closure disk 27, with second sealing member 29, is moved away from sealing relationship with the first sealing member 23, to permit flow of fluid through the check valve 1 and conduit 9.

Such check valves are known in the art and are commercially available. In order to determine the operability of such check valves which may remain in closed position for long periods of time, it is necessary to either dismantle the valve or to pass fluid through the conduit and the check valve in a direction so as to pivot the disk, in order to assure that the pivotal disk will pivot to open position.

In accordance with the present invention, a check valve is provided wherein the check valve body 3 and the first sealing member 23 are formed from a nonmagnetic material. The check valve body 3, for example, may be formed from an austenitic type of stainless steel, while the first sealing member is also formed from a nonmagnetic material. The pivotal closure disk is formed from a magnetic material such as a ferritic type of stainless steel. An especially useful material is Series 410 ferritic stainless steel.

Figure 2:
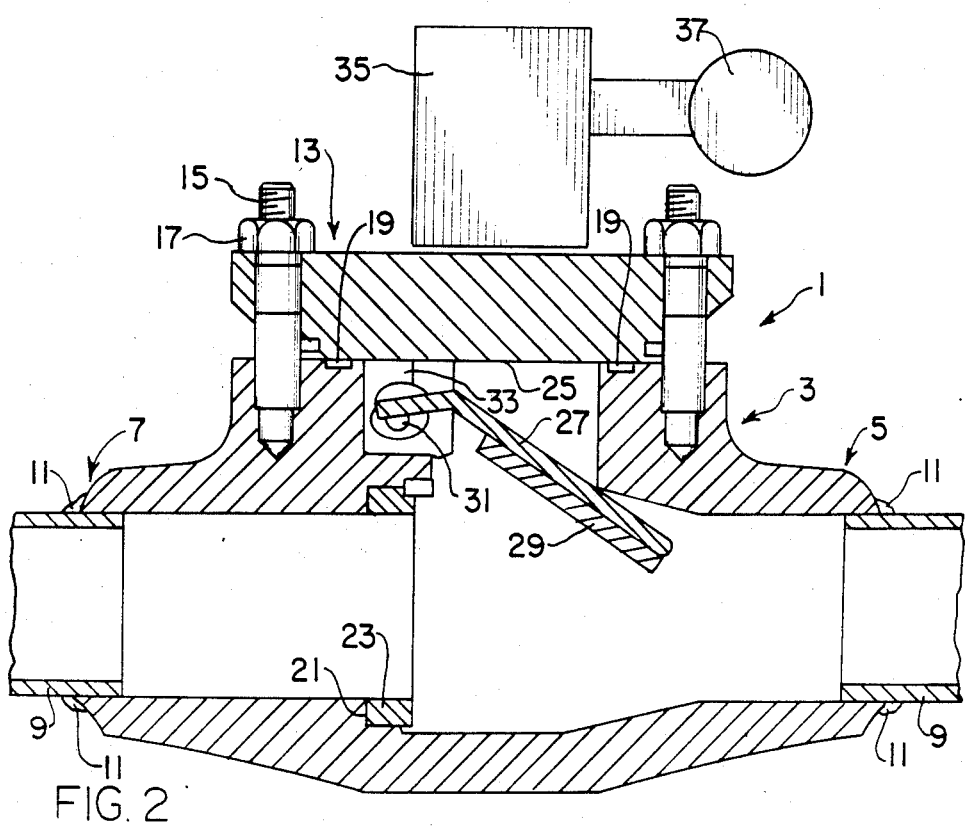
FIG. 2 illustrates the application of a magnetic field by a magnetic field generator to cause the valve disk to move from sealing position and measurement of the attraction between the magentic field generator and the magnetic valve disk to determine the relative position of the magnetic disk to the sealing member and operability of the check valve.

As illustrated in FIG. 2, the check valve 1 may be tested for operability without the need to pass fluid through the valve or dismantle the valve. For testing, a magnetic field generator 35 is brought into proximity to the check valve body 3, in a direction which will create a magnetic field to act on the check valve disk 27, formed for magnetic material, and cause the valve disk 27 to move away from the first sealing member 23. Since the valve body itself is formed from nonmagnetic material, the magnetic field will act only on the disk 27 and cause the disk to pivot, along pivot 31, to an open position. The magnetic field generator may be any portable means for providing a magnetic field. The magnetic field generator also has a meter 37 that measures the amount of flux (attraction) between the magnetic field generator 35 and the valve disk 27. As the valve disk pivots and approaches the field source, the magnetic flux increases until the valve disk 27 is prevented from moving further, by contact with the valve body 3 as shown in FIG. 2. By measurement of the attraction between the magnetic valve disk 27 and the magnetic field generator 35, on meter 37, the relative position of the magnetic valve disk 27 to the first sealing member 23 can be determined.

What is claimed is:

1. A method of testing a check valve having a pivotal closure disk in a valve body, for operability, without the need for flow of fluid through the check valve, and without the need for any levers or extensions which extend through the valve body, comprising:

providing a check valve that is formed from a check valve body and first sealing member of nonmagnetic material and a pivotal closure disk of magnetic material having a second sealing member;

applying a magnetic field, by means of a magnetic field generator, to the check valve in a direction which will cause the magnetic closure disk to move away from said first sealing member; and measuring the attraction between the magnetic field generator and the magnetic closure disk to determine the relative position of the magnetic closure disk to the first sealing member.

2. A method of testing a check valve as defined in claim 1 wherein said check valve body and first sealing member are formed of austenitic stainless steel.

3. A method of testing a check valve as defined in claim 2 wherein said pivotal closure disk is formed of ferritic stainless steel.

4. A method of testing a check valve as defined in claim 3 wherein said ferritic stainless steel is Series 410 ferritic stainless steel.

5. A method of testing a check valve having a pivotal closure disk in a valve body, for operability, without the need for flow of fluid through the check valve, and without the need for any levers or extensions which extend through the valve body, comprising:

providing a check valve that is formed from a check valve body of austenitic stainless steel and first sealing member of nonmagnetic material and a pivotal closure disk of ferritic stainless steel having a second sealing member;

applying a magnetic field, by means of a magnetic field generator, to the check valve in a direction which will cause the ferritic stainless steel closure disk to move away from said first sealing member; and measuring the attraction between the magnetic field generator and the ferritic stainless steel closure disk to determine the relative position of the magnetic closure disk to the first sealing member.

* * * * *